(12) United States Patent
Quiter et al.

(10) Patent No.: US 8,075,326 B2
(45) Date of Patent: Dec. 13, 2011

(54) JUNCTION BOX AND CONTACT ELEMENT FOR PHOTOVOLTAIC MODULES

(75) Inventors: Michael Quiter, Ebersberg (DE); Sven Braun, München (DE)

(73) Assignees: Yamaichi Electronics Co., Ltd. (JP); Yamaichi Electronics Deutschland GmbH (DE)

( * ) Notice: Subject to any disclaimer, the term of this patent is extended or adjusted under 35 U.S.C. 154(b) by 0 days.

(21) Appl. No.: 12/752,519

(22) Filed: Apr. 1, 2010

(65) Prior Publication Data

US 2010/0216336 A1 Aug. 26, 2010

Related U.S. Application Data (63) Continuation of application No. PCT/EP2008/010486, filed on Dec. 10, 2008.

(30) Foreign Application Priority Data

Jan. 8, 2008 (DE) .......................... 10 2008 003 448

(51) Int. Cl.
*H01R 27/00* (2006.01)
(52) U.S. Cl. ........................................ 439/224; 439/907
(58) Field of Classification Search .................. 439/224, 439/907
See application file for complete search history.

(56) References Cited

U.S. PATENT DOCUMENTS

| | | |
|---|---|---|
| 6,075,201 A | 6/2000 | Wambach |
| 2005/0054219 A1* | 3/2005 | Werner et al. ................ 439/76.1 |
| 2005/0054244 A1 | 3/2005 | Werner et al. |
| 2006/0000504 A1 | 1/2006 | Feldmeier et al. |
| 2006/0289053 A1* | 12/2006 | Nieleck et al. ................ 136/244 |

FOREIGN PATENT DOCUMENTS

| | | |
|---|---|---|
| DE | 197 34 306 C1 | 2/1999 |
| DE | 203 11 184 U1 | 2/2004 |
| DE | 203 11 183 U1 | 7/2004 |
| DE | 10 2004 020958 B3 | 8/2005 |
| EP | 1 601 024 A | 11/2005 |
| EP | 1 729 348 A | 12/2006 |

OTHER PUBLICATIONS

International Search Report dated Apr. 6, 2009 to corresponding international patent application No. PCT/EP2008/010486, 3 pages.
English Translation of International Preliminary Report on Patentability dated Aug. 10, 2010 to corresponding international patent application No. PCT/EP2008/010486, 8 pages.
Notification of the First Office Action issued by the State Intellectual Property Office of the People's Republic of China from corresponding Chinese Patent Application No. 200880109881.3, 22 pages.

* cited by examiner

*Primary Examiner* — Ross Gushi
(74) *Attorney, Agent, or Firm* — Maier & Maier, PLLC (57) ABSTRACT

A socket for a circuit board, comprising: a base having an opening area for introducing an electrical conductor of the circuit board, a contact element for electrically contacting a conductor of the circuit board, and an electrical output electrically connected to the contact element, wherein the contact element comprises a returning connecting contact spring disposed in an introduction area, wherein said spring can be actuated returnably by applying a force along a force direction, such that the electrical conductor can be disposed between a connecting contact area and the connecting contact spring, and wherein each contact element is configured such that the electrical conductor can be brought into contact with the contact element by any desired contact configurations or combinations of contact configurations.

16 Claims, 8 Drawing Sheets

Fig. 8 ered embodiments are subject of the dependent claims.
JUNCTION BOX AND CONTACT ELEMENT FOR PHOTOVOLTAIC MODULES This is a continuation of the International Application No. PCT/EP2008/010486 filed on Dec. 10, 2008.

BACKGROUND

1. Technical Field

The invention relates to a junction or connection box, a use, a photovoltaic or solar panel, a contact element, and a method.

2. Related Art

Conventional solar or photovoltaic modules for generating electric energy from sunlight comprise one or more single solar or photovoltaic cells. Depending on the desired voltage and/or current to be provided by the solar module, the individual solar cells are connected in parallel and/or in series within the module and thus gathered in photovoltaic or solar cell groups. The solar cell groups are integrated in a flat solar module. The electrical terminals of the solar cell groups of the solar module are routed to the outside. In case of a partial decrease of the radiation intensity by sunlight onto individual solar cells or solar cell groups, for example by soiling or shading, the following effects may occur among others: (1) A (constant) decrease of the radiation intensity within the solar cell groups connected together leads to a reduced performance of the respective solar cell group. (2) If a solar cell within a solar cell group is partially shaded, this shaded solar cell acts as a blocking diode or resistor within the circuit of the solar cell group, which on the one hand may result in the entire solar cell group no longer being able to supply electric energy, and on the other hand in a damage of the shaded solar cell and thus to a permanent breakdown of the solar cell group.

In any case, different voltages may be applied between the routed-out terminals of the solar cell group of a solar module, depending on the radiation intensity onto the individual solar cells. A connection in series of the solar cell groups by corresponding circuiting of the terminals routed to the outside analogously leads to the above-mentioned problems.

In order to avoid the problems related with the differing radiation intensity of the solar cells, conventional so-called bypass diodes are used, which are electrically connected in an anti-parallel manner with respect to the solar cell groups. These bypass diodes have the effect that the current flow through the solar module is lead past solar cell groups that only supply low power, i.e. the terminals of this solar cell group of a solar module are short-circuited by the bypass diode and the corresponding cell group is bypassed thereby. Thus, such a solar cell group does no longer contribute to the overall performance of the solar module, but the overall current flow through the solar panel is substantially unobstructed and a damage of individual solar cell is avoided.

Therefore, in addition to the solar module, solar panels usually comprise an electrical junction or connection box with at least two contact devices and at least one bypass diode. The solar cells in a solar module are usually connected to each other by flat, thin conductor bands. These conductor bands are routed out of the solar module and manually contacted with an electrical terminal receptacle. The junction box of the solar panel therefore usually has an opening on the side facing the solar module, through which opening the conductor bands are routed through and connected to the contact elements. Conventionally, the junction box is subsequently filled with an insulating resin in order to fixedly connect the conductor bands with each other and to insulate them from each other. The solar module provided with the junction box is referred to as photovoltaic or solar panel.

Depending on the assembly method of a junction box to a solar module, wherein junction boxes may be mounted to a solar module for example manually or in an automated manner, the junction boxes are formed differently for different solar modules. It is therefore an object of the invention to provide a universal junction box that can particularly be employed within the framework of different assembly methods and thus allows a simple and cost-efficient assembly.

The objects are solved by the independent claims. Preferred embodiments are subject of the dependent claims.

SUMMARY

Junction Box According to One Aspect

One aspect of the present invention relates to a junction or connection box for a circuit or conductor board, in particular for a photovoltaic or solar module, comprising:
- a base carrier with at least one opening area for inserting at least one electrical conductor of the conductor board,
- at least one contact element for electrical contact with at least one conductor of the conductor board, and
- at least one electrical output for outputting electric power of the conductor board, which is electrically connected with the at least one contact element, wherein
  the at least one contact element comprises at least one resilient terminal contact spring arranged in an insertion area,
  by application of a force to the terminal contact spring along a direction of force K, the at least one terminal contact spring is resiliently operable such that the at least one electrical conductor is arrangeable at least in some area(s) between at least one terminal contact area and the at least one terminal contact spring, and wherein
  each contact element is configured such that the at least one electrical conductor is contactable with the contact element by means of at least two of the following contact configurations:
    first contact configuration: the contact element is configured such that the at least one electrical conductor is insertable into the insertion area of the contact element along a first insertion direction E1 and the at least one electrical conductor is contactable with the contact element by means of the terminal contact spring in the insertion area;
    second contact configuration: the contact element is configured such that the at least one electrical conductor is insertable into the insertion area of the contact element along a second insertion direction E2 and the at least one electrical conductor is contactable with the contact element by means of the terminal contact spring in the insertion area, wherein the first and the second direction E1, E2 are different from each other;
    third contact configuration: the contact element is configured such that the at least one electrical conductor is contactable with a contact device of the contact element, wherein the contact device is arranged outside the insertion area.

BRIEF DESCRIPTION OF THE DRAWINGS

Preferred embodiments of the present invention will exemplarily be described in the following on the basis of the accompanying drawings.

DESCRIPTION OF EXEMPLARY EMBODIMENTS

Advantageously, the junction box according to the invention is adapted for use with differently designed circuit or conductor boards and for use of different contact configurations, so that for equipping different conductor boards, the number of different junction boxes to be kept in stock can be reduced. Thereby, the storage costs of the manufacturer are reduced. Furthermore, the number of pieces of junction boxes of the same kind, which are to be produced, can be increased, whereby the unit costs per junction box usually decrease as well.

In other words, due to the fact that the contact elements are configured so as to have at least two contact configurations, the junction box can be used particularly flexibly. The junction box is not limited to one type of connection, but is also adapted for different connection possibilities, since it has at least two contact configurations. Thus, the junction box can be used for different types of connections and/or solar panels. For example, by means of the first contact configuration, the junction box may be adapted to be automatically connected to a solar panel. By means of the third configuration, the junction box may e.g. be adapted to be connected manually. Further connection possibilities are possible as well.

Preferably, it is possible that the electrical conductor of the conductor board, which contacts the electrical contact element or is brought into contact with it, contacts the electrical contact element or is brought into contact with it according to exactly one contact configuration. Thus, the electrical conductor preferably does not contact the contact element according to the first contact configuration and at the same time according to the second contact configuration. Furthermore, the electrical conductor preferably does not contact the contact element according to the first contact configuration and at the same time according to the third contact configuration. In addition, the electrical conductor preferably does not contact the contact element according to the second contact configuration and at the same time according to the third contact configuration. Also, the electrical conductor preferably does not contact the contact element according to the first contact configuration and at the same time according to the second contact configuration and at the same time according to the third contact configuration. The above explanations analogously apply to the contact element. Thus, the contact element is preferably configured to be contactable or suited to be brought into contact with merely exactly one electrical conductor of the conductor board according to exactly one of the three contact configurations. In other words, the contact element is preferably configured to not be contacted with a first electrical conductor of the conductor board according to one of the three contact configurations at the same time and a second electrical conductor of the conductor board according to another of the three contact configurations at the same time.

DEFINITION OF TERMS

For an easier understanding of the invention, a number of terms will be exemplarily defined in the following.

The junction box is arrangeable on a flat circuit or conductor board. For a unique description of directions and geometric relations, it is assumed in the following description that the substantially planar base carrier of the junction box is aligned parallel to a planar face of a circuit or conductor board. Let this planar face be spanned by the two orthogonal direction vectors of the x and y directions of a Cartesian coordinate system. Perpendicular thereto, i.e. perpendicular to the plane of the conductor board and the base carrier, the z direction extends upward. For example, the junction box may be aligned parallel to a horizontal face of a conductor board and the z direction faces upward, i.e. opposite to the gravity direction.

Then, the direction(s) of force and/or displacement direction(s) may be indicated with respect to the thus defined orthogonal Cartesian coordinate system. If the term "substantially" is used in the following description in connection with an indication of direction, this means in particular that the direction to be indicated from the mentioned reference direction by less than approx. ±45 degrees, preferably by less than approx. ±30 degrees, further preferably by less than approx. ±15 degrees, and particularly preferably by less than ±10 degrees, in particular by less than ±5 degrees.

The above-mentioned positions and directions are exemplary only and serve as a reference for the description of e.g. sides of the junction box and/or for determination of directions in order to indicate for example uniquely definable and determinable coordinates. Optionally, other positions or a different coordinate system may be used as well.

The term "in the interior" as used in this application in particular describes a volume area or spatial area for example surrounded by the housing of the junction box. The surrounding does not have to be complete, but openings may e.g. be provided in the housing. In other words, the term "in the interior" particularly describes the internal volume of the junction box. It is also not necessary here that the junction box is closed. For example, the junction box may have a lid and the lid must not be arranged on the junction box. Nevertheless, the term "in the interior" describes the internal volume as if the lid was arranged. In other words, the term "in the interior" describes the internal volume of an ideally fully closed junction box. The contact device may also be arranged such that a part of the contact device projects out or is routed out of the junction box through a corresponding opening. However, as long as a part or area of the contact device, in particular the area in or on which the electrical conductor is arrangeable, is arranged within the internal volume of the junction box, this area is "in the interior" of the junction box. Thus, the term "in the interior" logically also includes e.g. "substantially in the interior" and also "at least partially in the interior".

The term "direction of force" as defined by the invention describes a direction along which a force may be applied. For example, the direction of force K may be substantially perpendicular to a bottom face or the base carrier of the junction box. The bottom face is e.g. the face that includes the opening areas and/or at or on which the contact device(s) is/are arranged. For example, the direction of force K may be substantially perpendicular to a face or surface of the conductor board at or on which the junction box is arranged. It is also possible that the direction of force K encloses an angle between approx. 85° and approx. 60°, in particular an angle between approx. 85° and approx. 65°, in particular an angle between approx. 75° and approx. 70°, with the reference plane, for example the bottom of the junction box and/or the surface of the conductor board. Particularly preferably, the direction of force K is oriented such that upon application of a force along the direction of force K, the terminal contact spring is displaceable or displaced at least in some area(s) and/or elastically deformable or deformed, i.e. is actuateable or actuated, at least in some area(s). For example, the direction of force K points from the junction box toward the conductor board. A direction anti-parallel to the direction of force K for example points from the conductor board toward the junction box.

The at least one terminal contact spring and the at least one terminal contact area of each contact element may be displaceable relative to each other. Here, in particular the terminal contact spring is at least in some area(s) displaceable along a displacement direction V relative to the terminal contact area. In other words, one or more terminal contact spring(s) may be formed resiliently. The force in the direction of force K may e.g. be applied to the at least one terminal contact spring. In particular, the terminal contact spring may move away from the terminal contact area if the terminal contact area is fixed, in particular along the displacement direction V, or the terminal contact spring may be movable away from the terminal contact area by application of a sufficiently great force in the direction of force K. If the terminal contact area is also formed in a resilient manner or as a spring, the terminal contact spring and the terminal contact area may move away from each other by a mutual movement.

The term "position of rest" as defined by the present invention for example describes the state or position of one or more electrical components, in particular the contact element or components of the contact element. The contact element may e.g. have one or more receptacles or receiving devices as preferred insertion area(s) into which external electrical conductors, for example an electrical conductor of the conductor board, are insertable. In the position of rest of the corresponding receptacle or the component comprising said receptacle, for example the corresponding external electrical conductor is not inserted into the receptacle and does not contact this receptacle electrically and/or or mechanically. The term "position of rest" as defined by the present invention in particular describes that position of e.g. the terminal contact spring, in which the terminal contact spring is when the junction box is not connected with the conductor board. In other words, in the position of rest of the terminal contact spring, the junction box is e.g. not mounted at or on the conductor board. In the position of rest, the electrical conductors are at least not yet inserted into the insertion area(s). In addition, an electrical and/or mechanical contact between the terminal contact spring and the terminal contact area may be present in the position of rest. In other words, the position of rest of the terminal contact spring corresponds to that position in which the terminal contact spring is when no external force, in particular in the direction of force K, is applied to the terminal contact spring. In this case, however, due to the resilience of the terminal contact spring, a force can act on the terminal contact spring if the terminal contact spring contacts the terminal contact area mechanically. Thus, the terminal contact spring is not in a relaxed state. However, it is not necessary that the terminal contact spring contacts the terminal element in the position of rest. In this case, the position of rest is the position the terminal contact spring takes up in a substantially relaxed state when no force is applied. A gap or clearance is provided between the terminal contact area and the area of the terminal contact spring, which is contactable with an electrical conductor.

The term "actuating position" as defined by the present invention describes for example a state or position of the above-mentioned electrical components, in particular the contact element, different from the above-mentioned state or the above-mentioned position. In contrast to the position of rest, an external force is applied to one or more parts or the electrical components in the actuating position, i.e. a force from another element that is in particular not part of the contact element and/or in particular is not the terminal contact area. In particular, it is possible in the actuating position that one or more electrical conductors are insertable or inserted into the insertion area. The term "actuating position" as defined by the present invention thus in particular describes a position in which the terminal contact spring and the terminal contact area are spaced from each other. For example, the actuating position may be achieved by applying a force in the direction of force K to the terminal contact spring. Due to the applied force, the terminal contact spring for example moves from the position of rest to the actuating position. Here, both a mechanical and/or an electrical contact between the terminal contact spring and the terminal contact area may be disconnected. However, the conductor may e.g. as well be arranged between the terminal contact spring and the terminal contact area. Particularly preferably, the terminal contact spring is formed resiliently, i.e. it is elastically and/or plastically deformable such that it substantially returns to the position of rest after action of a deforming force.

The term "operating position" as defined by the present invention describes the position of the components, in particular the terminal contact spring, in an operational state of the junction box. If the terminal contact spring is not actuated any more, the terminal contact spring can press an inserted conductor against the terminal contact area of the contact element due to the spring force. Depending on the design of the conductor and the spring force of the terminal contact spring, the terminal contact spring may also be in mechanical and/or electrical contact with the conductor, without pressing the conductor against the terminal contact area. If the terminal contact spring is in the operating position, it contacts the terminal contact area however only indirectly via the electrical conductor.

The "insertion direction" as defined by the present invention is e.g. a direction in which one or more electrical conductors are routed or routeable into the junction box, in particular into an insertion area of the at least one contact element of the junction box. For example, the insertion direction may be parallel to a longitudinal axis of one or all electrical conductors. The first insertion direction E1 may be substantially perpendicular to the face or surface of the conductor board or the base carrier, i.e. substantially parallel to the z direction. Furthermore, the first insertion direction E1 may substantially correspond to the insertion direction of the electrical conductors through the opening area of the base carrier, i.e. preferably an angle of <45 degrees, in particular <30 degrees, is enclosed between the insertion direction E1 and the insertion direction of the electrical conductors. The second insertion direction E2 is different from the first insertion direction E1, i.e. an angle of preferably ≧1 degree, further preferably ≧2 degrees, ≧5 degrees, ≧10 degrees, ≧15 degrees, ≧30 degrees, ≧45 degrees, and particularly preferably ≧90 degrees, may be enclosed between the first and second insertion directions E1, E2. In particular, the second insertion direction E2 may be opposite to the z direction, i.e. substantially anti-parallel to the first insertion direction E1. In other words, the first insertion direction and the second insertion direction may enclose an angle between approx. 170° and approx. 190°, particularly approx. 180°.

Preferably, the contact element is mechanically and/or electrically connected with the base carrier of the junction box and/or the electrical output of the junction box via a fixing area. In particular, the contact element is mechanically and/or electrically, in particular by means of a diode, connectable with a further contact element via the fixing area.

The term "contact" as defined by the present invention in particular includes electrical and/or mechanical contact.

Preferred Embodiments of the Junction Box

Preferably, the contact element is configured such that the at least one electrical conductor is contactable with the contact element at least by means of the first and the second contact configuration.

Preferably, the contact element is configured such that the at least one electrical conductor is contactable with the contact element at least by means of the first and the third contact configuration.

Preferably, the contact element is configured such that the at least one electrical conductor is contactable with the contact element at least by means of the second and the third contact configuration.

Preferably, the contact element is configured such that the at least one electrical conductor is contactable with the contact element at least by means of the first, the second and the third contact configuration.

Preferably, the junction box according to the third contact configuration is configured such that the at least one electrical conductor is insertable into at least one clamping area of the contact element along a third insertion direction E3, wherein the third insertion direction E3 is different from the first insertion direction E1 and/or the second insertion direction E2.

In particular, the clamping area may also be designed as a contact device for electrically and/or mechanically contacting the electrical conductor with the contact element. Further preferably, the clamping area is designed so as to deform the electrical conductor plastically and/or elastically at least in some area(s), in order to be or come into frictional and/or positive engagement with the electrical conductor at least in some area(s). Alternatively or in addition, also the clamping area itself may be plastically and/or elastically deformable at least in some area(s) in order to be or come into frictional and/or positive engagement with the electrical conductor at least in some area(s).

Preferably, the third insertion direction E3 is oriented substantially perpendicular to the first insertion direction E1 and/or the second insertion direction E2.

In other words, it is advantageously possible to route the electrical conductor into the junction box substantially parallel to the first or the second insertion direction E1, E2, to then bend the electrical conductor by an angle α different from zero, and to fix it mechanically to the contact element in a simple manner by insertion into the clamping area of the contact element and/or connect it electrically with the contact element. Preferably, the amount of the angle α lies in a range from approx. 45 to approx. 135 degrees, particularly preferably in a range from approx. 70 to approx. 110 degrees, in particular approx. 90 degrees. If the third insertion direction E3 is preferably substantially perpendicular to the first insertion direction E1, it is advantageously not possible that a further strain relief is provided, which prevents the electrical conductor from being withdrawn from the junction box opposite to the first insertion direction E1 and/or from being displaced otherwise.

Preferably, the contact element is designed to be contactable with a planar or flat conductor or conductor band of the conductor board. The electrical conductor has in particular a width-thickness ratio of >2, particularly preferably >5, >10, >20, >50, and in particular >100. Further preferably, the flat electrical conductor may be a foil conductor, i.e. a compound of a polymer foil with an electrical conductor fixed thereto, wherein the fixation on the polymer foil is in particular performed by means of vacuum deposition or gluing. Particularly preferably, the contact element is formed substantially planar in the contact area with the flat electrical conductor. Advantageously, the transition resistance between the electrical conductor of the conductor board and the contact element is reduced.

Preferably, the contact element is configured such that the at least one electrical conductor is insertable into the junction box through the at least one opening area along the first insertion direction E1.

Preferably, each contact element is designed to receive exactly one electrical conductor in the insertion area.

In other words, the contact element has at least two of the three contact configurations, i.e. the contact element is configured to contact the electrical conductor at least by means of two different contact configurations. However, the insertion area is designed to design only a single conductor. This also applies particularly if the contact element has the first and second configurations. In this case, the electrical conductor may be inserted into the insertion area either along the first or along the second insertion direction. Preferably, it is not possible that a first conductor is inserted along the first insertion direction E1 and a second conductor along the second insertion direction E2.

Preferably, the junction box is designed such that several electrical conductors are insertable into the junction box through a common opening area, and the electrical conductors are contactable with a contact element each.

Preferably, the insertion area is arranged above the at least one opening area. Particularly preferably, each insertion area is arranged above an opening area. The insertion area is preferably formed to receive at least one conductor. In particular, each electrical conductor is inserted into the junction box through an opening area assigned to it, and particularly preferably, after insertion into the junction box, each electrical conductor is inserted into an assigned insertion area of a contact element and contacted with this contact element. Particularly preferably, exactly one electrical conductor is inserted into an insertion area, i.e. each insertion area is assigned exactly one electrical conductor, and vice versa.

In other words, the junction box may in particular be designed to receive a plurality of electrical conductors, wherein the junction box has a number of contact elements equal to the number of electrical conductors.

Preferably, in particular according to the third contact configuration, the at least one electrical conductor can be soldered together with at least one contact device of the contact element.

In particular, due to the insertion, the electrical conductor is fixable in the clamping area and soldered or solderable to or together with the contact device without the electrical conductor being arranged or having to be arranged in the insertion area between the terminal contact spring and the terminal contact area. Further preferably, the electrical conductor may be fixed in the clamping area and be soldered thereto or therewith.

Preferably, the contact element is designed such that the force can be applied to the terminal contact spring along the direction of force K by means of the at least one electrical conductor. In particular, the electrical conductor is formed in a rigid manner such that the terminal contact spring is brought from the position of rest to the actuating position due to the force applied during insertion of the electrical conductor. In other words, the terminal contact spring may be designed such that the electrical conductor brings the terminal contact spring into the actuating position. In this case, the actuating position corresponds to the operating position.

Preferably, the contact element (11) is designed such that the force can be applied to the terminal contact spring (15) along the direction of force K by means of an auxiliary means. In particular, the electrical conductors may be too flexible to apply a force to the terminal contact spring in order for it to be brought from the position of rest to the actuating position. In particular, it is then possible to bring the terminal contact spring into the actuating position with an auxiliary means in order to insert the electrical conductor into the insertion area.

Advantageously, it is in particular not necessary for the electrical conductor to directly and/or indirectly apply a force during insertion into the insertion area, and merely very little force is required. This is advantageous in that the electrical lines are usually designed as thin conductor bands. These thin conductor bands can be easily deformed and/or bent and can thus correspondingly only apply low forces or these conductors may only be loaded with low forces, without a deformation of the conductors, for example. Furthermore, the insertion of the electrical lines does substantially not require any further manual work or manual procedures. Therefore, it is advantageously possible that automatic insertion equipment takes over this job. By an external application of force to bring the terminal contact spring into the actuating position, advantageously greater forces can be applied than it would be possible by the electrical lines themselves, in order to overcome the resilient force of the terminal contact spring. Therefore, springs, in particular terminal contact springs, may advantageously be used, which have an increased or very high resilient force, whereby a secure contacting is established in a particularly advantageous manner, and the junction box is securely and fixedly connectable with the electrical conductors of the solar module. Preferably, the resilient force is approx. 6 to approx. 30 N, particularly preferably approx. 10 to approx. 20 N.

Preferably, the at least one terminal contact spring is formed resiliently such that the electrical conductor and the terminal contact spring are in contact in an operating position.

Preferably, the at least one terminal contact spring is formed resiliently such that the conductor is fixed in the insertion area of the contact element in the operating position. In particular, an electrical conductor arranged between the terminal contact spring and the terminal contact area is fixed and connected with the contact element in an electrically conducting manner if the force that can be applied to the terminal contact spring in the direction of force K is missing. In particular, the electrical conductor can be brought into electrical and/or mechanical contact with the terminal contact area by means of the terminal contact spring.

Since the electrical conductor is fixed to or on the contact element either by the terminal contact spring and/or by the clamping area and/or by being soldered together with the contact device, advantageously two or more electrical conductors may be arranged in the junction box. In particular, two contact elements or more, for example four, six, eight, ten, twelve, contact elements may be arranged in the junction box. If the electrical conductors are connected with the respective contact elements and fixed therewith, it is advantageously not necessary to additionally fix and/or electrically insulate the electrical conductors from each other by filling with a synthetic resin. Thus, the junction box can be mounted to or on the conductor board, in particular automatically or manually, in a simple and secure manner.

Preferably, the at least one contact element is arranged relative to the at least one opening area such that the direction of force K and the insertion direction E1 are opposed.

Here, the direction of force K is the directional component of the force leading to a displacement and/or deformation, in particular along the displacement direction V, of the terminal contact spring, so that an electrical conductor is insertable between the terminal contact spring and the terminal contact area. Thus, the direction of force K can cause a displacement and/or deformation of the terminal contact spring along the displacement direction V at least in some area(s), wherein the displacement direction may be in particular substantially perpendicular to the direction of force K. The angle between the direction of force K and the displacement direction V substantially depends on the point or the face to which the force is applied. For example, the direction of force K may correspond to the displacement direction V if the direction of force K is perpendicular to a surface of the terminal contact spring to which the force is applied. Alternatively, an L-shaped terminal contact spring may be loaded with a force along a direction of force K at or on one leg such that by the bending of the other leg a displacement and/or deformation of the terminal contact spring in a displacement direction substantially perpendicular to the direction of force K takes place at least in some area(s).

Preferably, the terminal contact spring is a leaf spring. Due to the preferred design of the body of the terminal contact spring substantially as a leaf spring, the terminal contact spring can advantageously be produced in a particularly simple and cost-effective manner.

Preferably, the contact element is formed monolithically or in one piece. For example, the contact element may be formed of metal or a metal alloy.

Use According to One Aspect

A further aspect of the invention relates to the use of an inventive junction or connection box for arrangement to or on a circuit or conductor board, in particular to or on a photovoltaic or solar module, wherein the junction box is arranged at or on a face of the conductor board, and the at least one contact element is electrically connected with at least one electrical conductor of the solar module. In particular, the junction box can be arranged on the conductor board, and then the at least one contact element can be connected with at least one electrical conductor of the solar module in an electrically conducting manner. For example, the junction box may be glued to or onto the conductor board.

Solar Panel According to One Aspect

A further aspect of the present invention relates to a photovoltaic or solar panel, comprising:
  at least one substantially plate-shaped photovoltaic or solar module, and
  at least one junction box according to the invention, wherein the solar module comprises at least one electrical conductor, and the at least one electrical conductor projects through an opening area of the junction box and is connected with a contact element of the junction box.

In other words, the solar panel may comprise: a photovoltaic or solar module having a substantially plate-shaped body with at least one voltage-generating photovoltaic or solar cell, at least two conductor bands connected with the at least one solar cell, which conductor bands are routed out of the solar cell at or on a surface thereof and are substantially perpendicular thereto, and at least one junction box according to the invention.

Contact Element According to One Aspect

A further aspect of the invention relates to a contact element for arrangement in a junction or connection box; in particular for use in a junction box, wherein the contact element is arrangeable in the interior of the junction box such that at least one electrical conductor is insertable into the junction box through an opening area and that the at least one contact element is electrically contactable with at least one electrical output of the junction box for outputting electric power of a conductor board, in particular a photovoltaic or solar module, wherein the at least one contact element comprises at least one resilient terminal contact spring arranged in an insertion area, by application of a force to the terminal contact spring along a direction of force K, the at least one terminal contact spring is resiliently operable such that the at least one electrical conductor is arrangeable at least in some area(s) between at least one terminal contact area and the at least one terminal contact spring, and wherein each contact element is configured such that the at least one electrical conductor is contactable with the contact element by means of at least two of the following contact configurations:

first contact configuration: the contact element is configured such that the at least one electrical conductor is insertable into the insertion area of the contact element along a first insertion direction E1 and the at least one electrical conductor is contactable with the contact element by means of the terminal contact spring in the insertion area;

second contact configuration: the contact element is configured such that the at least one electrical conductor is insertable into the insertion area of the contact element along a second insertion direction E2 and the at least one electrical conductor is contactable with the contact element by means of the terminal contact spring in the insertion area, wherein the first and the second direction E1, E2 are different from each other;

third contact configuration: the contact element is configured such that the at least one electrical conductor is contactable with a contact device of the contact element, wherein the contact device is arranged outside the insertion area.

The at least one electrical conductor may be inserted or insertable into the interior of the junction box through an opening area substantially parallel to the first insertion direction E1.

Method According to One Aspect

A further aspect of the invention relates to a method for arranging a junction box according to one of the preceding claims to or on a conductor or circuit board, in particular a photovoltaic or solar module, with the steps:

arranging the junction box at or on a face of the conductor board;

electrically contacting at least one electrical conductor of the conductor board with a contact element of the junction box, wherein for electrical contacting, a choice is made between at least two of the following electrical contacting procedures:

upper electrical contacting procedure: the at least one electrical conductor is inserted into the insertion area of the contact element along a first insertion direction E1 and the at least one electrical conductor is contacted with the contact element by means of the terminal contact spring in the insertion area;

lower electrical contacting procedure: the at least one electrical conductor is inserted into the insertion area of the contact element along a second insertion direction E2 and the at least one electrical conductor is contacted with the contact element in the insertion area of the terminal contact spring, wherein the first and the second direction E1, E2 are different from each other;

outer electrical contacting procedure: the at least one electrical conductor is contacted with a contact device of the contact element, wherein the contact device is arranged outside the insertion area.

The present invention is not limited to the above-described exemplary embodiments. Instead, individual elements and/or features of each described aspect and/or of each described embodiment may be combined with individual elements and/or features of the further aspects and/or further embodiments in an arbitrary manner and thus form further aspects and/or embodiments.

Figure 1:
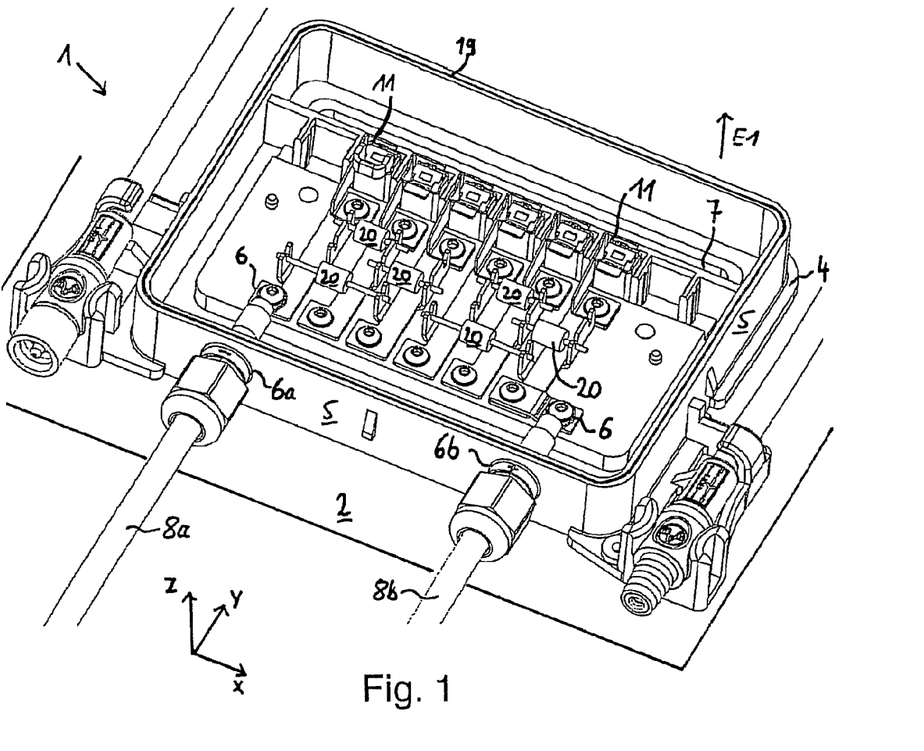
FIG. 1 is a perspective view of an embodiment of a junction box.

FIG. 1 shows a perspective view of an embodiment of a junction or connection box 1 for circuit or conductor board(s) 2, in particular photovoltaic or solar module(s) 2, wherein the electrical lines 9 of the conductor board(s) 2 are routed out in form of conductor bands.

A junction box 1 is arranged at or on the terminal side of the solar module 2 or the conductor board 2 or at or on the same. The junction box 1 has a housing, which comprises a base carrier 4, a wall 5, two electrical outputs 6, an opening area 7 and a lid (not shown). The base carrier 4 is arranged on the side of the junction box 1 facing the solar module 2 or the conductor board 2, i.e. at the bottom. The side of the junction box 1 facing away from the solar module 2 is accordingly referred to as "top". The lid (not shown) is arranged on this side in order to close the junction box 1. The base carrier 4 preferably serves to fix the junction box 1 on the terminal side of the solar module 2. The base carrier 4 has an opening area 7 for routing through the electrical lines 9 of the solar module 2. Preferably, in this embodiment, all electrical lines 9 are routeable through a single opening area 7 through the base carrier along the insertion direction E1, i.e. from bottom to top.

The wall 5 of the base carrier 4 substantially extends perpendicular to the base carrier 4. Preferably, in an area of the wall 5 there are arranged two outside terminal areas 6a, 6b, which in this embodiment are each formed as connectable cable feedthrough. The outside terminal areas 6a, 6b are designed to mechanically fix the fed-through cables 8a, 8b and to protect the interior of the junction box 1 from the entering dirt or moisture. At one end each, the cables 8a, 8b are electrically contacted with an electrical output 6 of the junction box 1 in order to electrically connect the respective electrical output 6 with an external device (not shown). In other words, the wall 5 comprises two openings that allow the cables 8a, 8b to each be in a direct electrical contact with at least one contact element 11 in the interior of the junction box 1, in fact, as shown in FIG. 1, for example by means of the outputs 6. The outputs 6 in particular serve to output electric power generated by the solar module 2 upon illumination. It is for this purpose that the cables 8a, 8b may be arranged. The outputs 6 may also be in direct contact with the surrounding of the junction box 1, i.e. the outputs 6 may be designed to lead electric power from the interior of the junction box to the outside.

Moreover, at its upper edge, the wall 5 has a groove 19 in at least some areas, in which groove a seal may preferably be arranged, so that the junction box 1 can be closed by the lid in particular in a fluidtight, particularly preferably watertight, manner. Likewise, the openings in the outside terminal areas 6a, 6b may be closed in a fluidtight manner.

In this embodiment, six contact elements 11 are attached to the base carrier 4, which are designed to contact, in the assembled state of the junction box 1, i.e. substantially in the operating position of the terminal contact springs 15, the electrical conductors 9 of the solar module 2, in particular in the form of conductor bands. The contact elements 11 are mutually connected with blocking diodes 20, so that in the case of a voltage drop between two contact elements 11, which exceeds a predetermined or predeterminable threshold value, a short circuit is established.

Figure 2:
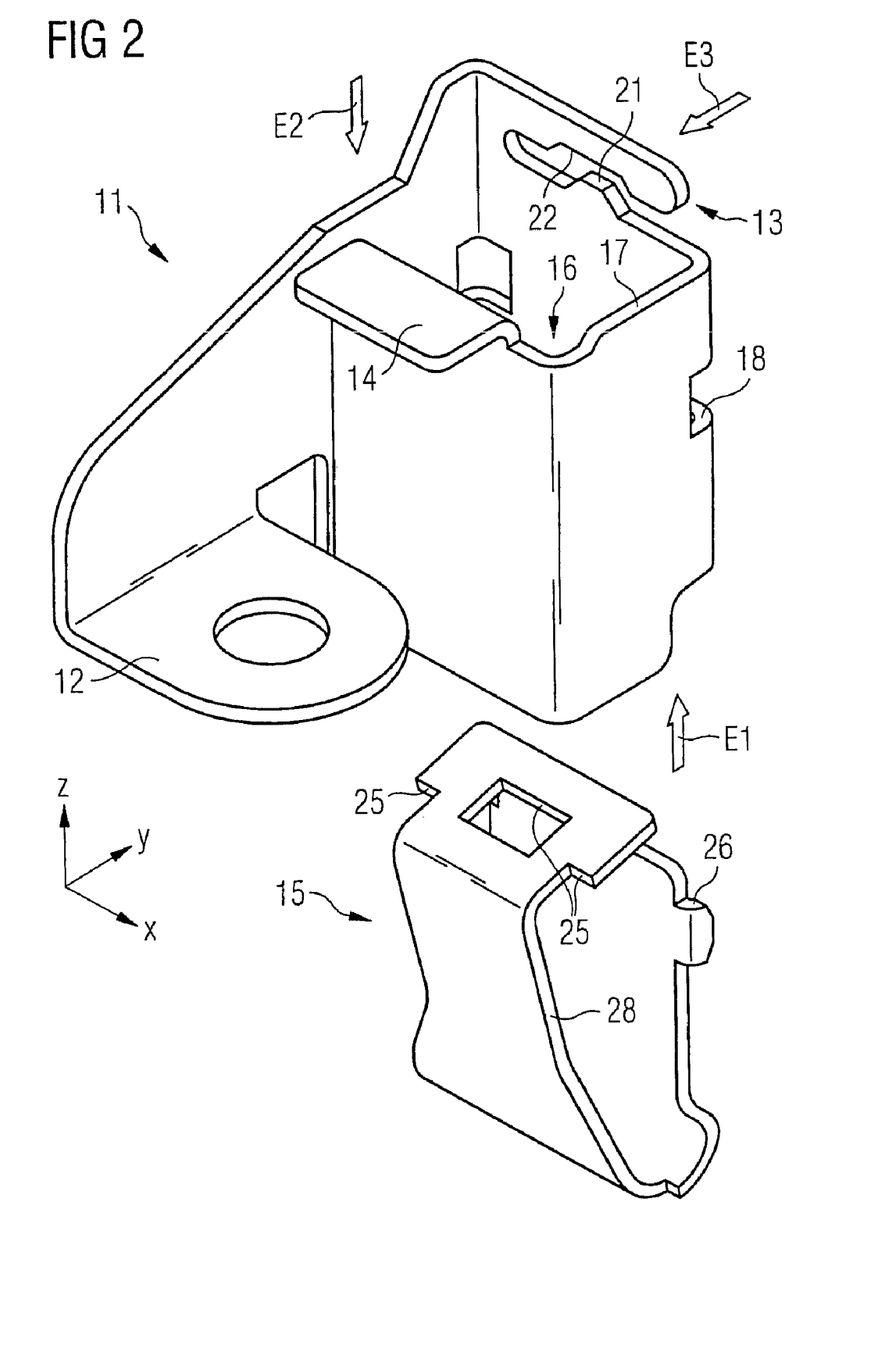
FIG. 2 is a perspective exploded view of a contact element of the junction box with a terminal contact spring.

FIG. 2 shows a perspective view of the contact element 11 of the junction box 1 and the terminal contact spring 15. Preferably, the contact element 11 is integrally or monolithically formed of metal and comprises a fixing area 12, a clamping area 13, a contact device 14, a terminal contact spring receptacle 17 and at least one terminal contact spring fixing area 18. These areas are electrically connected with each other by the metallic body of the contact element 11. The contact element 11 may be connected mechanically and/or electrically with the base carrier 4 and/or the electrical output 6 via the fixing area 12. The contact element may also comprise several parts that together form the contact element 11. The parts may be glued and/or pressed and/or crimped and/or welded and/or soldered, etc., together. It is also possible that individual parts are put into one or more other parts.

The clamping area 13 is formed as an elongated recess in the contact element 11 and is designed to receive and fix the electrical conductor 9. Preferably, the clamping area 13 may be designed to elastically and/or plastically deform an electrical conductor in order to fix it in the clamping area 13. In particular, the illustrated embodiment shows a projection 21 and a corresponding recess 22, which bend a flat, band-shaped electrical conductor 9 elastically along a bending axis thereof along the insertion direction E3, so that the electrical conductor 9 is fixed in the clamping area 13 due to its elastic resilience force. In other words, the surface of the conductor 9 can be changed by means of the projection 21 and the recess 22 such that the conductor 9 has a trench or a groove.

The contact device 14 is formed as a planar area, wherein a longitudinal extension of the contact device 14 is along the insertion direction E3, so that an electrical conductor 9 routed through the clamping area 13 along the insertion direction E3 is capable of contacting the contact device 14 an in particular of being soldered together with it.

The terminal contact spring receptacle 17 of the contact element is designed to receive the terminal contact spring 15 at least in some area(s). In particular, the terminal contact spring 15 can be inserted into the contact element 11 along an insertion direction E1.

In this embodiment, the terminal contact spring receptacle 17 is formed substantially as a hollow profile, in particular with a substantially rectangular cross-section e.g. in the horizontal sectional plane and/or substantially rectangular cross-section in the substantially vertical sectional plane. Preferably, a terminal contact area 24, substantially planar in at least some areas, is arranged such that it extends along the insertion direction E1. The terminal contact area is located in the insertion area 16. An electrical conductor may be inserted into the contact element 11, in particular into the insertion area 16, through a lower or upper opening of the contact element 11 or the insertion area 16 in particular along the first insertion direction E1, i.e. from the bottom, or along the second insertion direction E2, i.e. from the top.

The substantially planar terminal contact area 24 is formed such that it contacts an electrical conductor 9 (shown in FIG. 4) arranged in the insertion area 16 and extending along the insertion direction E1.

The terminal contact spring 15 comprises two fixing areas 26, which are preferably formed as projections in this embodiment, and one leaf spring area 28. The two fixing areas 26 are in particular designed so as to come into engagement with the corresponding terminal contact spring fixing areas 18 of the contact element 11 at least in some area(s), in order to fix the terminal contact spring 15 in the contact element 11. The leaf spring area 28 substantially forming the body of the terminal contact spring 15 is preferably substantially formed as a planar leaf spring.

In particular, the terminal contact area 24 and the terminal contact spring fixing areas 18 of the contact element 11 and the terminal contact spring 15 are formed such that, due to the spring force of the terminal contact spring 15, the terminal contact area 24 and the terminal contact spring 15 are mechanically and electrically connected in the position of rest, i.e. the terminal contact spring 15 presses against the terminal contact area 24 of the contact element 11 in the position of rest. In particular, the terminal contact spring 15 is fixed by an engagement of the two fixing areas 26 in the terminal contact spring fixing areas 18 of the contact element 11.

The terminal contact spring 15 may be designed to be actuated due to the insertion of the electrical conductor and/or by action of an auxiliary means. To this end, the auxiliary means may be inserted into the insertion area 16 along an insertion direction E1, E2 and actuate the terminal contact spring 15, in particular deform it elastically and/or plastically.

The terminal contact spring 15 may further have one or more actuator areas 25, which may in particular also be arranged external to the insertion area 16, in order to apply a force along a direction of force K, so that the terminal contact spring can be brought from the position of rest to the actuating position.

The auxiliary means (not shown) for actuating the terminal contact spring 15 preferably comprises one, in particular a pair of, actuating finger(s), which is/are formed in a conical or wedge-like manner preferably along the insertion directions E1, E2, for each terminal contact spring 15 to be actuated. The actuating fingers of one pair are preferably arranged in a mutually spaced manner, so that the electrical conductor 9 is insertable between the actuating fingers of said pair. By the insertion of the auxiliary means, the terminal contact spring 15 is brought from the position of rest to the actuating position, so that an electrical conductor can be inserted in the clearance formed by the terminal contact spring 15, the terminal contact area 24 and the auxiliary means.

In other words, a force is applied to the terminal contact spring 15 in the direction of force K due to the insertion of the auxiliary means along the insertion directions E1, E2. In the actuating position, the terminal contact spring 15 is spaced from the terminal contact area 24 at least in some area(s). The terminal contact spring 15, which is in the actuating position, the terminal contact area 24 and the actuating finger(s) surround an insertion area 16, so that the electrical conductor 9 routed through the opening area 7 can be arranged in the insertion area 16 substantially without application of an insertion force.

After the auxiliary means has been removed, the terminal contact spring 15 displaces back toward its position of rest until it reaches the operating position. The electrical conductor 9 is then arranged between the terminal contact spring 15 and the terminal contact area 24 and held, in particular clamped, by the resilient force of the terminal contact spring 15.

Figure 3:
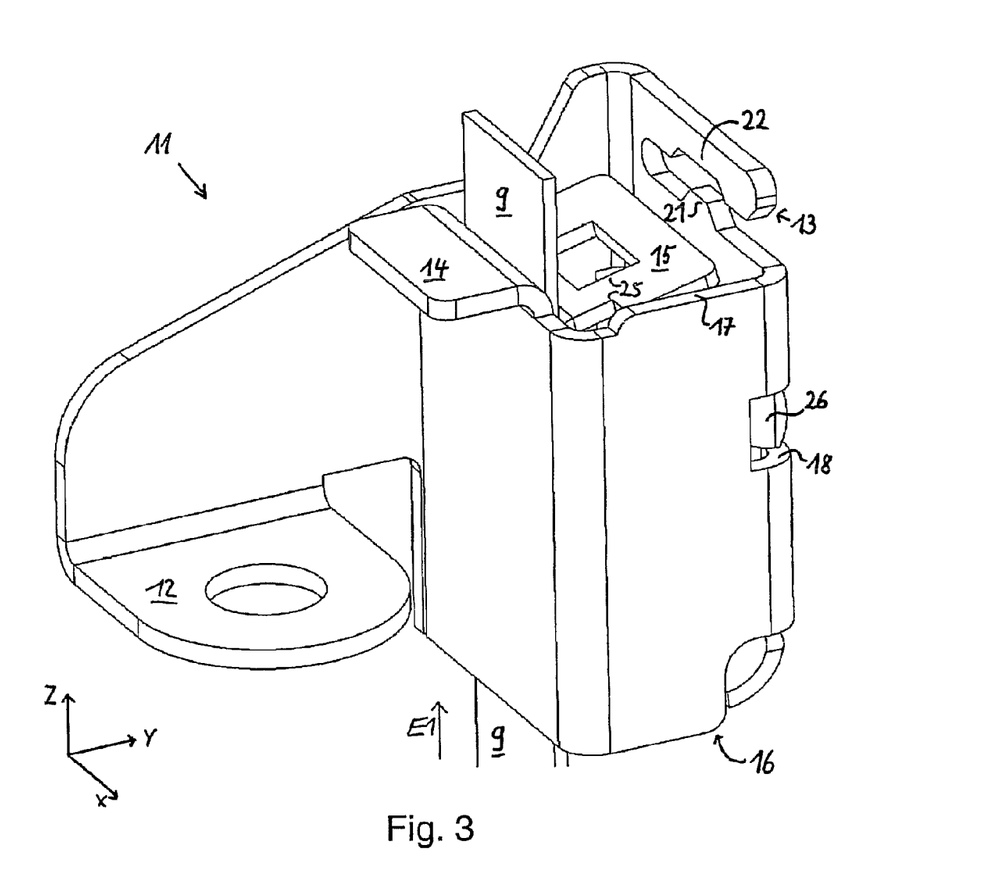
FIG. 3 is a perspective view of the contact element of the junction box in an assembled state with an electrical conductor inserted in a first insertion direction.
Figure 4:
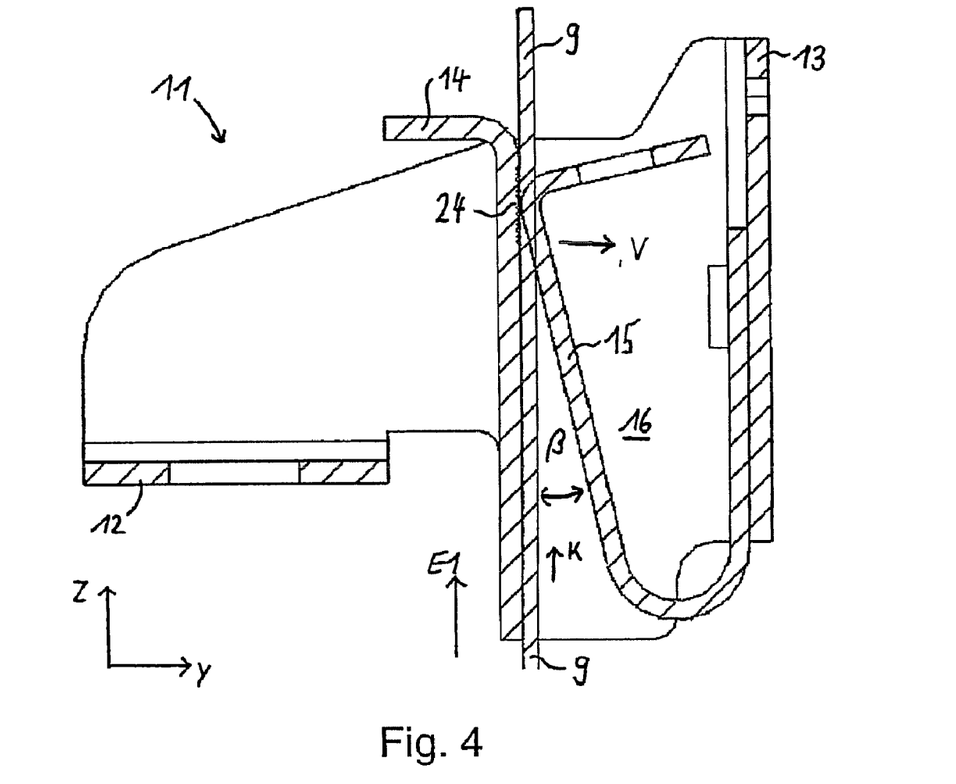
FIG. 4 is a cross section through the contact element according to FIG. 3.

FIG. 3 shows a perspective view, and FIG. 4 shows a cross section of the contact element 11 of the junction box 1 in an assembled state with an electrical conductor 9 inserted in the first insertion direction E1. FIGS. 3 and 4 thus exemplarily represent the first contact configuration.

Preferably, the terminal contact area 24 is arranged and formed such that it extends in a planar manner along the insertion direction E1 at least in some area(s), so that the terminal contact area 24 contacts the electrical conductor band 9 that extends along the insertion direction E1. Here, the conductor band 9 is inserted into the contact element 11 through a lower opening of the contact element 11.

Preferably, the leaf spring area 28 of the terminal contact spring 15 is arranged such that the longitudinal extension of the leaf spring area 28 encloses an acute angle β with the longitudinal extension of the terminal contact area 24, i.e. the insertion direction E1. The acute angle β is preferably between 5 and 80 degrees, further preferably between 5 and 45 degrees, and particularly preferably between 5 and 20 degrees.

Further preferably, the terminal contact spring 15 is formed such that upon insertion along the insertion direction E1, the electrical conductor 9 applies sufficient force in the direction of force K to bring the terminal contact spring 15 from the position of rest to the actuating position, wherein the terminal contact spring 15 is displaced along the displacement direction V in some area(s).

In particular, the terminal contact area 24 and the terminal contact spring 15 are formed such that the electrical conductor 9, inserted and arranged therebetween, is electrically connected with the terminal contact area 24 and/or the terminal contact spring 15 in the actuating position but without force applied, due to the spring force of the terminal contact spring 15. Further preferably, due to the spring force, the electrical conductor 9 is fixed, in particular clamped, between the terminal contact spring 9 and the terminal contact area 24. This fixation may be releasable. That means, by application of a force in the direction of force K, the terminal contact spring 15 can be displaced that much that the electrical conductor 9 can be removed from the insertion area 16. Thus, the contact element 15 is reusable. Alternatively or in addition, the terminal contact spring 15 may also be designed such that by application of a correspondingly great force, the electrical conductor 9 can be removed opposite to the direction of force K and the connection between the electrical conductor 9 and the contact element 11 is thus releasable.

Furthermore, the end area of the electrical conductor 9 may be bent substantially at right angles in order to bring it into contact with the contact device 14, in particular to solder the electrical conductor 9 to the contact device 14. Thus, the electrical conductor 9 can be fixed in the contact element 11 by means of the first contact configuration and at the same time be fixed to or on the contact element 11 by means of the third configuration.

Figure 5:
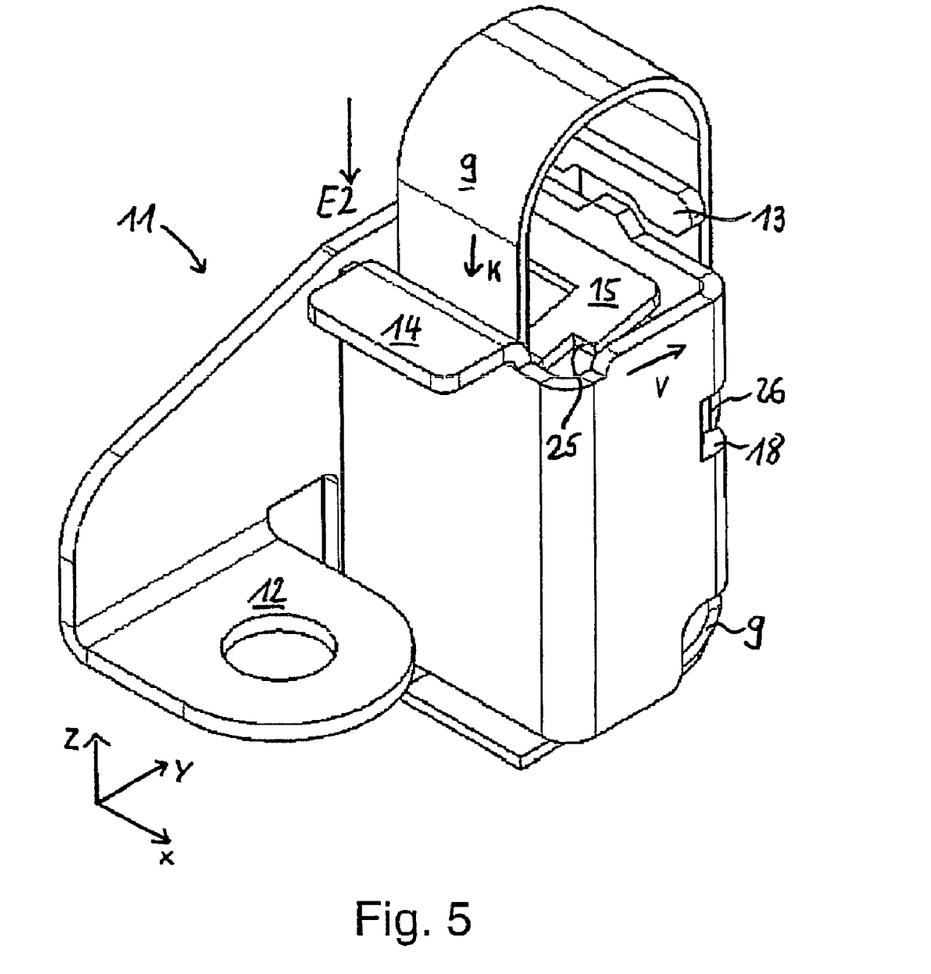
FIG. 5 is a perspective view of the contact element of the junction box with an electrical conductor inserted in a second insertion direction.
Figure 6:
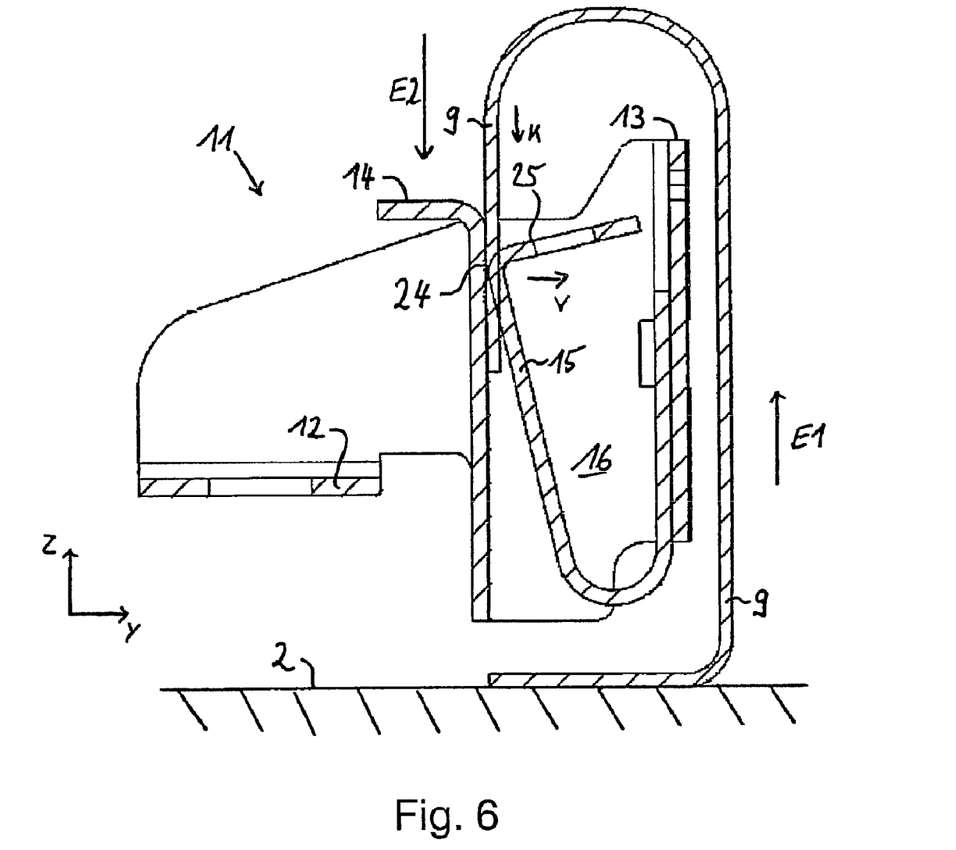
FIG. 6 is a cross section through the contact element according to FIG. 5.

FIG. 5 shows a perspective view, and FIG. 6 shows a cross section of the contact element 11 of the junction box 1 in an assembled state with an electrical conductor 9 inserted in the second insertion direction E2. FIGS. 5 and 6 thus exemplarily represent the second contact configuration.

Preferably, the terminal contact area 24 is arranged and formed such that it extends in a planar manner along the insertion direction E2 at least in some area(s), so that the terminal contact area 24 contacts the electrical conductor 9 that extends along the insertion direction E2. Here, the electrical conductor 9 is inserted into the interior of the contact element 11 from above through an upper opening of the contact element 11.

Further preferably, the terminal contact spring 15 is formed such that sufficient force may be applied to the actuator area 25 of the terminal contact spring 15 in the direction of force K directly or indirectly via an auxiliary means, in order to bring the terminal contact spring 15 from the position of rest to the actuating position along the displacement direction V. In the actuating position, the insertion area 16 between the terminal contact spring 15 and the terminal contact area 14 is unblocked or uncovered, so that the electrical conductor 9 can be inserted there along the second insertion direction E2 and arranged between the terminal contact spring 15 and the terminal contact area 24.

As explained in the description of the FIGS. 3 and 4, the terminal contact area 24 and the terminal contact spring 15 are in particular formed such that the electrical conductor 9 inserted and arranged therebetween is clamped between the terminal contact area 24 and the terminal contact spring 15 and electrically connected therewith. The fixation of the electrical conductor 9 may also be releasable. In particular, the fixation may be designed such that a mere withdrawal of the electrical conductor is not possible.

The electrical conductor 9 illustrated in FIGS. 5 and 6 is routed around the clamping area 13 and pushed into the insertion area 16 along the insertion direction E2. Alternatively, the electrical conductor 9 may also be routed through the clamping area 13 along the insertion direction E3 in order to then be bent substantially at right angles and be inserted into the insertion area along the insertion direction E2. Thus, the electrical conductor 9 may be fixed to or on the contact element 11 by means of the third contact configuration and at the same time be fixed in the contact element 11 by means of the second contact configuration.

Figure 7:
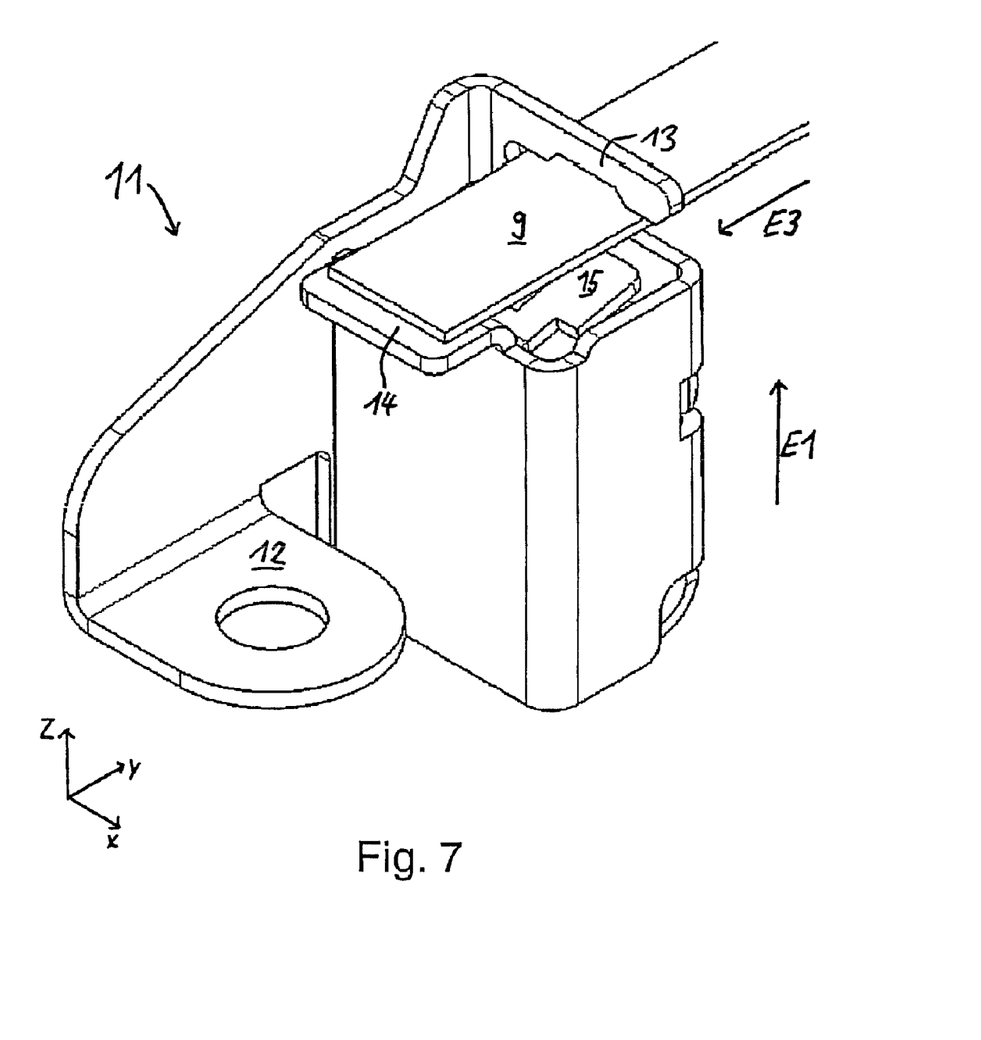
FIG. 7 is a perspective view of the contact element of the junction box with an electrical conductor inserted in a third insertion direction.
Figure 8:
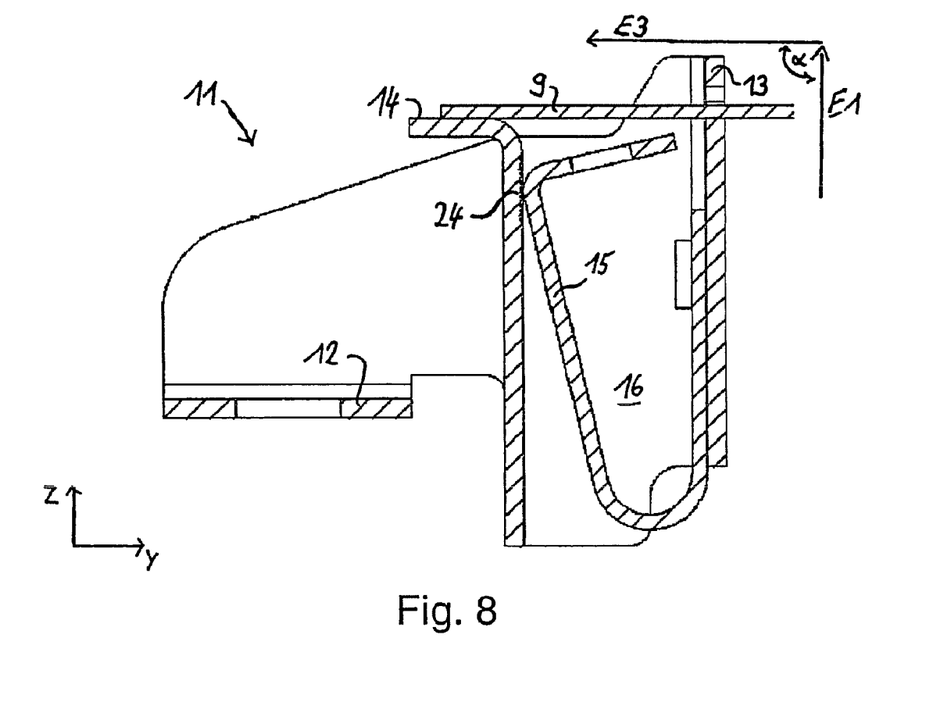
FIG. 8 is a cross section through the contact element according to FIG. 7.

FIG. 7 shows a perspective view, and FIG. 8 shows a cross section of the contact element 11 of the junction box 1 with an electrical conductor 9 inserted in the third insertion direction E3. FIGS. 7 and 8 thus exemplarily represent the third contact configuration.

The electrical conductor 9 is routed through the clamping area 13 along the insertion direction E3 and extends further along the insertion direction E3 in order to contact the contact device 14. The electrical conductor 9 can directly or indirectly contact the contact device 14 by means of a solder in a mechanical and/or an electrical manner. In particular, the electrical conductor 9 may be connected with the contact device 14 by soldering and/or gluing such that the connection can only be released by again heating the contact device 14 or the electrical conductor 9 or the solder and/or by using, in particular applying, a solvent. The electrical conductor 9 may also be welded to the contact device 14.

Preferably, the electrical conductor 9 is inserted into the interior of the junction box 1 through the opening area 7 of the junction box along the insertion direction E1 and bent by an angle α in the direction of the insertion direction E3, in order to insert the electrical conductor 9 into the clamping area 13 along the insertion direction E3. Preferably, the angle α is between approx. 45 to approx. 135 degrees, particularly preferably between approx. 70 to approx. 110 degrees, in particular approx. 90 degrees.

The present description of the preferred embodiments is not limited to the above-described respective figures. Instead, the explanations of the respective figures apply analogously to the further figures as well. Likewise, the explanations of the figures also apply to the preceding aspects and embodiments. Thus, by means of the individual features described with respect to the (respective) figures and/or by means of the individual features of the aspects and/or (individual features) of embodiments, further preferred embodiments may be formed, wherein the individual features can be combined in an arbitrary manner.

This application is based upon and claims the benefit of priority from the prior German patent application No. DE 10 2007 003 448.7, filed on Jan. 8, 2008; the entire contents of which is incorporated herein by reference.

What is claimed is:

1. A junction box for a conductor board, in particular for a solar module, comprising:
   a base carrier with at least one opening area for inserting at least one electrical conductor of the conductor board;
   at least one contact element for electrical contact with at least one conductor of the conductor board; and
   at least one electrical output for outputting electric power of the conductor board, which is electrically connected with the at least one contact element, wherein:
   each contact element is integrally or monolithically fowled of metal and comprises a clamping area, a contact device, a terminal contact spring receptacle, an insertion area and a resilient terminal contact spring arranged in the insertion area, said insertion area being a hollow which is formed by the terminal contact spring receptacle;
   the terminal contact spring receptacle comprises two terminal contact spring fixing areas and a terminal contact area, said terminal contact area being located in the insertion area;
   the terminal contact spring comprises two fixing areas, each of which is to engage with the corresponding terminal contact spring fixing area of the terminal contact spring receptacle
   by application of a force to the terminal contact spring along a direction of force, the at least one terminal contact spring is resiliently operable such that the at least one electrical conductor is arrangeable in at least one area between the terminal contact area and the at least one terminal contact spring; and wherein:
   each contact element comprises the following contact configurations:
   first contact configuration: the contact element is configured such that the at least one electrical conductor is insertable into the insertion area of the contact element along a first insertion direction and the at least one electrical conductor is contactable with the contact element by means of the terminal contact spring in the insertion area;
   second contact configuration: the contact element is configured such that the at least one electrical conductor is insertable into the insertion area of the contact element along a second insertion direction and the at least one electrical conductor is contactable with the contact element of the terminal contact spring in the insertion area, wherein the first and the second insertion direction are opposite to each other;
   third contact configuration: the contact element is configured such that the at least one electrical conductor is insertable into the clamping area of the contact element and contactable with the contact device of the contact element along a third insertion direction, wherein the contact device is arranged outside the insertion area and the third insertion direction is oriented substantially perpendicular to both of the first and the second insertion directions.

2. The junction box according to claim 1, wherein the contact element is designed to be contactable with a flat conductor.

3. The junction box according to claim 1, wherein the contact element is configured such that the at least one electrical conductor is insertable into the junction box through the at least one opening area along the first insertion direction.

4. The junction box according to claim 1, wherein each contact element is designed to receive exactly one electrical conductor in the insertion area.

5. The junction box according to claim 1, wherein the junction box is designed such that several electrical conductors are insertable into the junction box through a common opening area, and the electrical conductors are contactable with a contact element each.

6. The junction box according to claim 1, wherein the insertion area is arranged above the at least one opening area.

7. The junction box according to claim 1, wherein the at least one electrical conductor can be soldered together with at least one contact device of the contact element.

8. The junction box according to claim 1, wherein the contact element is designed such that the force can be applied to the terminal contact spring along the direction of force by means of the at least one electrical conductor.

9. The junction box according to claim 1, wherein the contact element is designed such that the force can be applied to the terminal contact spring along the direction of force by means of an auxiliary means.

10. The junction box according to claim 1, wherein the at least one terminal contact spring is formed resiliently such that the electrical conductor and the terminal contact spring are in contact in an operating position.

11. The junction box according to claim 1, wherein the at least one terminal contact spring is formed resiliently such that the conductor is fixed in the insertion are in the operating position.

12. The junction box according to claim 1, wherein the at least one contact element is arranged relative to the at least one opening area such that the direction of force and the insertion direction are opposed.

13. The junction box according to claim 1, wherein the terminal contact spring is a leaf spring.

14. The junction box according to claim 1, further comprising an arrangement on a conductor board, in particular on a solar module, wherein the junction box is arranged on a face of a conductor board, and the at least one contact element is electrically connected with at least one electrical conductor of the solar module.

15. The junction box according to claim 1, further comprising: a solar panel, having at least one substantially plate-shaped solar module, wherein the solar module comprises at least one electrical conductor, and the at least one electrical conductor projects through an opening area of the junction box and is connected with a contact element of the junction box.

16. A contact element for arrangement in a junction box, comprising: wherein the contact element is arrangeable in the interior of the junction box such that at least one electrical conductor is insertable into the junction box through an opening area and that the at least one contact element is electrically contactable with at least one electrical output of the junction box for outputting electric power of the conductor board, wherein:
- each contact element is integrally or monolithically formed of metal and comprises a clamping area, a contact device, a terminal contact spring receptacle, an insertion area and a resilient terminal contact spring arranged in the insertion area, said insertion area being a hollow which is formed by the terminal contact spring receptacle;
- the terminal contact spring receptacle comprises two terminal contact spring fixing areas and a terminal contact area, said terminal contact area being located in the insertion area the terminal contact spring comprises two fixing areas, each of which is to engage with the corresponding terminal contact spring fixture area of the terminal contact spring receptacle;
- by application of a force to the terminal contact spring along a direction of force, the at least one terminal contact spring is resiliently operable such that the at least one electrical conductor is arrangeable in at least one area between the terminal contact area and the at least one terminal contact spring, and wherein:
- each contact element comprises the following contact configurations:
  - first contact configuration: the contact element is configured such that the at least one electrical conductor is insertable into the insertion area of the contact element along a first insertion direction and the at least one electrical conductor is contactable with the contact element by means of the terminal contact spring in the insertion area;
  - second contact configuration: the contact element is configured such that the at least one electrical conductor is insertable into the insertion area of the contact element along a second insertion direction and the at least one electrical conductor is contactable with the contact element of the terminal contact spring in the insertion area, wherein the first and the second insertion direction are opposite to each other;
  - third contact configuration: the contact element is configured such that the at least one electrical conductor is insertable into the clamping area of the contact element and contactable with the contact device of the contact element along a third insertion direction, wherein the contact device is arranged outside the insertion area and the third insertion direction is oriented substantially perpendicular to both of the first and the second insertion directions.

* * * * *